(12) United States Patent
Vanier et al.

(10) Patent No.: US 11,430,979 B2
(45) Date of Patent: Aug. 30, 2022

(54) LITHIUM ION BATTERY ANODES INCLUDING GRAPHENIC CARBON PARTICLES

(71) Applicant: PPG Industries Ohio, Inc, Cleveland, OH (US)

(72) Inventors: Noel R. Vanier, Wexford, PA (US); David B. Asay, Sarver, PA (US); Kurt G. Olson, Gibsonia, PA (US); Edward F. Rakiewicz, Gibsonia, PA (US); Donghai Wang, State College, PA (US); Ran Yi, State College, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 443 days.

(21) Appl. No.: 13/836,415

(22) Filed: Mar. 15, 2013

(65) Prior Publication Data
US 2014/0272591 A1    Sep. 18, 2014

(51) Int. Cl.

| | |
|---|---|
| *H01M 4/36* | (2006.01) |
| *H01M 4/62* | (2006.01) |
| *H01M 4/133* | (2010.01) |
| *B82Y 30/00* | (2011.01) |
| *H01M 4/134* | (2010.01) |
| *H01M 4/38* | (2006.01) |

(Continued)

(52) U.S. Cl.
CPC ............ *H01M 4/364* (2013.01); *B82Y 30/00* (2013.01); *C01B 32/182* (2017.08); *H01M 4/133* (2013.01); *H01M 4/134* (2013.01); *H01M 4/386* (2013.01); *H01M 4/387* (2013.01); *H01M 4/583* (2013.01); *H01M 4/622* (2013.01); *H01M 4/625* (2013.01); *H01M 4/661* (2013.01); *H01M 10/052* (2013.01); *C01B 2204/04* (2013.01); *C01B 2204/065* (2013.01); *H01M 2004/027* (2013.01); *Y02E 60/10* (2013.01)

(58) Field of Classification Search
CPC ...... H01M 4/133; H01M 4/134; H01M 4/386; H01M 4/60; H01M 4/622; H01M 4/625
USPC .............................. 429/212–217, 231.8, 232
See application file for complete search history.

(56) References Cited

U.S. PATENT DOCUMENTS

| | | |
|---|---|---|
| 5,527,518 A | 6/1996 | Lynum et al. |
| 6,099,696 A | 8/2000 | Schwob et al. |

(Continued)

FOREIGN PATENT DOCUMENTS

| | | | |
|---|---|---|---|
| GB | 2483373 A | * | 3/2012 |
| RU | 2 459 319 C1 | | 8/2012 |

(Continued)

OTHER PUBLICATIONS

Fitzer E., et al., "Recommended terminology for the description of carbon as a solid", Pure & Appl Chem, 1995, pp. 473, 67(3).

(Continued)

*Primary Examiner* — Barbara L Gilliam
*Assistant Examiner* — Helen M McDermott
(74) *Attorney, Agent, or Firm* — Alan G. Towner

(57) ABSTRACT

Lithium ion battery anodes including graphenic carbon particles are disclosed. Lithium ion batteries containing such anodes are also disclosed. The anodes include mixtures of lithium-reactive metal particles such as silicon, graphenic carbon particles, and a binder. The use of graphenic carbon particles in the anodes results in improved performance of the lithium ion batteries.

33 Claims, 2 Drawing Sheets

(51) Int. Cl.

| | |
|---|---|
| H01M 4/66 | (2006.01) |
| H01M 10/052 | (2010.01) |
| H01M 4/583 | (2010.01) |
| C01B 32/182 | (2017.01) |
| H01M 4/02 | (2006.01) |

(56) References Cited

U.S. PATENT DOCUMENTS

| | | | |
|---|---|---|---|
| 6,358,375 | B1 | 3/2002 | Schwob |
| 6,821,500 | B2 | 11/2004 | Fincke et al. |
| 7,071,258 | B1 | 7/2006 | Jang et al. |
| 7,754,184 | B2 | 7/2010 | Mercuri |
| 7,790,285 | B2 | 9/2010 | Zhamu et al. |
| 8,486,363 | B2 | 7/2013 | Hung et al. |
| 8,486,364 | B2 | 7/2013 | Vanier et al. |
| 2002/0114949 | A1 | 8/2002 | Bower et al. |
| 2005/0271574 | A1 | 12/2005 | Jang et al. |
| 2006/0093885 | A1 | 5/2006 | Krusic et al. |
| 2006/0216222 | A1 | 9/2006 | Jang |
| 2007/0045116 | A1 | 3/2007 | Hung et al. |
| 2008/0206124 | A1 | 8/2008 | Jang et al. |
| 2009/0022649 | A1 | 1/2009 | Zhamu et al. |
| 2009/0068471 | A1 | 3/2009 | Choi et al. |
| 2009/0075035 | A1 | 3/2009 | O'Brien et al. |
| 2009/0110627 | A1 | 4/2009 | Choi et al. |
| 2009/0117467 | A1 | 5/2009 | Zhamu et al. |
| 2009/0169467 | A1 | 7/2009 | Zhamu et al. |
| 2009/0269667 | A1 | 10/2009 | Antonietti et al. |
| 2010/0047154 | A1 | 2/2010 | Lee et al. |
| 2010/0055025 | A1 | 3/2010 | Jang et al. |
| 2010/0072430 | A1 | 3/2010 | Gergely et al. |
| 2010/0096597 | A1 | 4/2010 | Prud'Homme et al. |
| 2010/0143798 | A1 | 6/2010 | Zhamu et al. |
| 2010/0247801 | A1 | 9/2010 | Zenasni |
| 2010/0301212 | A1 | 12/2010 | Data et al. |
| 2010/0303706 | A1 | 12/2010 | Wallace et al. |
| 2010/0323113 | A1 | 12/2010 | Ramappa et al. |
| 2012/0064409 | A1 | 3/2012 | Zhamu et al. |
| 2012/0196074 | A1* | 8/2012 | Ago ............... B82Y 30/00 428/64.1 |
| 2012/0211160 | A1 | 8/2012 | Asay et al. |
| 2013/0052119 | A1* | 2/2013 | Kim ............... C23C 16/26 423/445 B |
| 2013/0084236 | A1 | 4/2013 | Hung et al. |
| 2013/0084237 | A1 | 4/2013 | Vanier et al. |

FOREIGN PATENT DOCUMENTS

| | | |
|---|---|---|
| RU | 2011 134 730 A | 2/2013 |
| WO | 01/29916 A1 | 4/2001 |
| WO | 2009/061685 A1 | 5/2009 |
| WO | 2009134492 A2 | 11/2009 |
| WO | 2010/074243 A1 | 7/2010 |
| WO | 2011012874 A1 | 2/2011 |
| WO | 2013049498 A1 | 4/2013 |

OTHER PUBLICATIONS

Dresselhaus MS, et al., "Structure of fullerenes", Science of fullerenes and carbon nanotubes, 1996, pp. 60-79, Chapter 3, Elsevier Inc., USA.
Fincke Jr, "Plasma pyrolysis of methane to hydrogen and carbon black", Ind Eng Chem Res, 2002, pp. 1425-1435, 41.
Du XS, "Facile synthesis of highly conductive polyaniline/graphite nanocomposites", Eur Polymer J, 2004, pp. 1489-1493, 40.
Gonzalez-Aguilar J et al., "Carbon nanostructures production by gas-phase plasma processes at atmospheric pressure", J Phys D: Appl Phys, 2007, pp. 2361-2374, 40.
Malesevic A, et al., "Synthesis of few-layer graphene via microwave plasma-enhanced chemical vapour deposition", Nanotechnology, 2008, 305604 (6pp.), 19.
Dato A, et al., "Substrate-free gas-phase synthesis of graphene sheets", Nano Letters, 2008, pp. 2012-2016, 8(7).
Subrahmanyam KS, et al., "Simple method of preparing graphene flakes by an arc-discharge method", J Phys Chem Lett, 2009, pp. 4257-4259, 113.
Coraux J, et al., "Growth of graphene on Ir(111)", New J Phys, 2009, 023006 (22pp.),11.
Gomez De Arco L., et al., "Synthesis, transfer, and devices of single- and few-layer graphene by chemical vapor deposition", IEEE Transactions on Nanotechnology, 2009, pp. 135-138, 8(2).
McWilliams A, "Graphene: Technologies, applications, and markets", BCC Res, 2009, pp. 1-25.
Tagawa K, et al., "Production processes for fabrication of lithium-ion batteries", Lithium Ion Batteries, 2009, pp. 181-194, Chapter 8, Springer, New York, USA.
Kim J, et al., "Fabrication of graphene flakes composed of multilayer graphene sheets using a thermal plasma jet system", Nanotechnology, 2010, 095601 (6pp.), 21.
Pristavita R, et al., "Carbon blacks produced by thermal plasma: the Influence of the reactor geometry on the product morphology", Plasma Chem Plasma Process, 2010, pp. 267-279, 30.
Nandamuri G, et al., "Chemical vapor deposition of graphene films", Nanotechnology, 2010, 145604 (4pp.), 21.
Su F-Y, et al., "Flexible and planar graphene conductive additives for lithium-ion batteries", J Mater Chem, 2010, pp. 9644-9650, 20.
Pristavita R, et al., "Carbon nano-flakes produced by an inductively coupled thermal plasma system for catalyst applications", Plasma Chem Plasma Process, 2011, pp. 393-403, 31.
Kang F-Y, et al., "Effects of carbonaceous materials on the physical and electrochemical performance of a LiFePO4 cathode for lithium-ion batteries", New Carbon Materials, 2011, pp. 161-170, 26(3).
Pristavita R, et al., "Carbon nanoparticle production by inductively coupled thermal plasmas: Controlling the thermal history of particle nucleation", Plasma Chem Plasma Process, 2011, pp. 851-866, 31.
Ji L, et al., "graphene/Si multiplayer structure anodes for advanced half and full lithium-ion cells", Nano Energy, 2011, doi:10.1016./j.nanoen.2011.08.003.
Su F-Y, et al., "Could graphene construct an effective conducting network in a high-power lithium ion battery?", Nano Energy, 2012, doi:10.106/j.nanoen.2013.02.004.
"Lithium iron phosphate battery", Wikipedia, http://en.wikipedia.org/wiki/Lithium_iron_phosphate_battery, last modified Feb. 27, 2014.
Lavoie, Martin "Synthesis of Carbon Black From Propane Using A Thermal Plasma", Master's Thesis in Applied Sciences, University of Sherbrooke, Faculty of Applied Sciences, Department of Chemical Engineering, Quebec, Canada, Sep. 1997.
Bergeron, Emmanuel "Production of Carbon by Pyrolysis of Methane in Thermal Plasma", Master's Thesis in Applied Sciences, University of Sherbrooke, Faculty of Applied Sciences, Department of Chemical Engineering, Quebec, Canada, Oct. 1997.
Kim, Keun Su et al. "Continuous Synthesis of Nanostructured Sheetlike Carbons by Thermal Plasma Decomposition of Methane", IEEE Transactions on Plasma Science, vol. 35, No. 2, Apr. 2007.
Rafiee, Mohammad A. et al., "Enhanced Mechanical Properties of Nanocomposites at Low Graphene Content", ACSNANO, vol. 3, No. 12, 2009.
Espacenet English abstract of RU 2011 134 730 A.
Espacenet English abstract of RU 2 459 319 C1.
Espacenet English abstract of WO 2010/074243 A1.
Komaba et al., "Study on Polymer Binders for High-Capacity SiO Negative Electrode of Li-Ion Batteries", The Journal of Physical Chemistry, 2011, 115, pp. 13487-13495.
Thomas Swan, "Elicarb® Graphene Powder and Elicarb® Graphene Dispersion (AQ)", Advanced Materials, 2014, 2 pp.
XG Sciences, The Material Difference, "xGnP Graphene Nanoplatelets: A unique carbon nonomaterial with multifunctional properties", 2013, 2 pp.

* cited by examiner

LITHIUM ION BATTERY ANODES INCLUDING GRAPHENIC CARBON PARTICLES

FIELD OF THE INVENTION

The present invention relates to lithium ion battery electrodes including graphenic carbon particles.

BACKGROUND OF THE INVENTION

Lithium ion batteries are well known. Silicon has been proposed for use as an active material for lithium ion batteries due to its very large theoretical specific capacity, which is more than an order of magnitude greater than the theoretical capacity of commonly used commercial carbon anodes. Tin has also been proposed for use as an active material due to its large specific capacity. A problem with these materials is that a large expansion takes place when they store lithium, which can result in fracturing and pulverization during charge-discharge cycling of the batteries. Capacity retention is therefore poor since the fractured and fragmented active material loses electrical contact with the battery anodes.

SUMMARY OF THE INVENTION

An aspect of the invention provides a lithium ion battery anode material comprising lithium-reactive metal particles, graphenic carbon particles, and a binder.

Another aspect of the invention provides a lithium ion battery comprising an anode, a cathode, a separator between the anode and the cathode, and an electrolyte in contact with the anode and the cathode, wherein the anode comprises lithium-reactive metal particles, graphenic carbon particles, and a binder.

DETAILED DESCRIPTION OF EMBODIMENTS OF THE INVENTION

Figure 1:
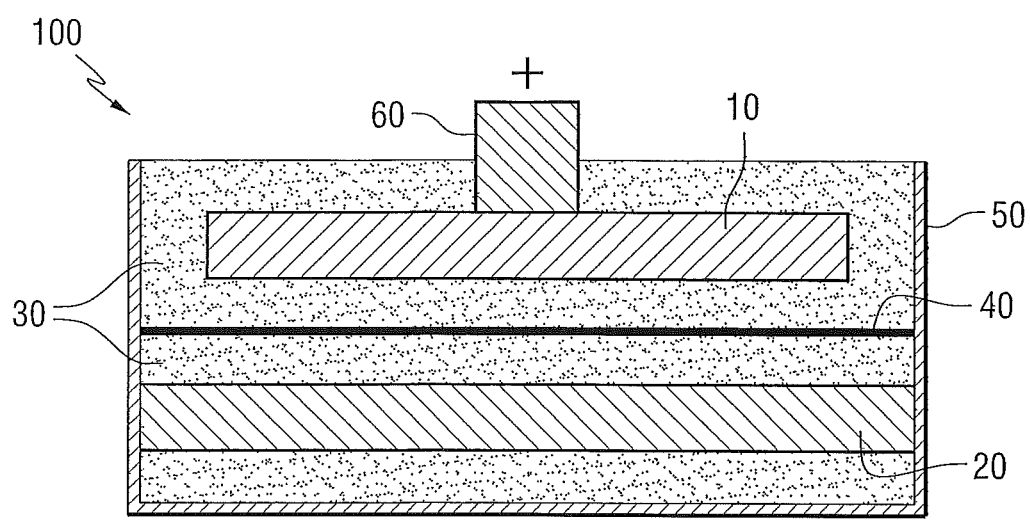
FIG. 1 is a partially schematic side sectional view of a lithium ion battery including an anode comprising graphenic carbon particles in accordance with an embodiment of the present invention.

FIG. 1 schematically illustrates a lithium ion battery 100 in accordance with an embodiment of the present invention. The battery 100 includes an anode 20, a cathode 10, a separator 40 between the anode and cathode, and an electrolyte 30 in contact with the anode and cathode. A casing 50 is provided in electrical contact with the anode 20. A terminal 60 is in electrical contact with the cathode 10.

The cathode 10 may be made of any known conductive material conventionally used in lithium ion batteries, such as copper or other metals. The electrolyte 30 may comprise any known electrolyte material conventionally used in lithium ion batteries, such as lithium-containing electrolyte salts dissolved in organic solvents. Examples of lithium-containing electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, $LiCl$, $LiBr$ and the like. Examples of organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. In certain embodiments, cyclic carbonates such as propylene carbonate, or chain carbonates such as dimethyl carbonate and diethyl carbonate may be used. These organic solvents can be used singly or in a combination of two types or more. In certain embodiments, the electrolyte 30 may also comprise additives or stabilisers such as VC (vinyl carbonate), VEC (vinyl ethylene carbonate), EA (ethylene acetate), TPP (triphenylphosphate), phosphazenes, LiBOB, LiBETI, LiTFSI, BP (biphenyl), PS (propylene sulfite), ES (ethylene sulfite), AMC (allylmethylcarbonate), and APV (divinyladipate).

In accordance with embodiments of the invention, the anode comprises a conductive substrate such as copper foil, or other metal foils, having a graphenic carbon particle-containing coating of the present invention deposited on one or both sides thereof. The graphenic carbon particle-containing anode material may include a mixture of the graphenic carbon particles with lithium-reactive particles such as Si and/or Sn and a binder.

In accordance with certain embodiments, the anode material comprises from 15 to 85 weight percent lithium-reactive metal particles, from 3 to 75 weight percent graphenic carbon particles, and from 3 to 60 weight percent binder. For example, the lithium-reactive metal particles may comprise from 25 to 70 weight percent, or from 30 to 50 weight percent. In certain embodiments, the graphenic carbon particles may comprise from 10 to 60 weight percent, or from 30 to 50 weight percent.

In certain embodiments, the lithium-reactive metal particles comprise Si, Sn or a combination thereof. The lithium-reactive metal particles may typically have an average particle size of less than 1,000 nanometers, for example, from 5 to 200 nanometers, or from 10 to 120 nanometers.

In certain embodiments, the binder of the anode material comprises a polymer. For example, the polymeric binder may include poly(acrylic acid) (PAA), acrylate polymers containing greater than 5 weight percent acrylic acid, carboxymethylcellulose, polymethacrylic acid, acrylate polymers containing greater than 5 weight percent methacrylic acid, polyvinylidene fluoride (PVDF), polytetrafluoroethylene (PTFE), acrylic latex dispersions, and the like.

The graphenic carbon particles used in the anodes of the present invention may be obtained from commercial sources, for example, from Angstron, XG Sciences and other commercial sources. In certain embodiments discussed in detail below, the graphenic carbon particles may be thermally produced in accordance with the methods and apparatus described in U.S. application Ser. Nos. 13/249,315 and 13/309,894, which are incorporated herein by reference.

As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology.

In certain embodiments, the graphenic carbon particles present in the anode compositions of the present invention have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles present in the compositions of the present invention have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

In certain embodiments, the graphenic carbon particles used in the anode compositions of the present invention have relatively low oxygen content. For example, the graphenic carbon particles used in certain embodiments of the compositions of the present invention may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles used in the anode compositions of the present invention have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles used in the anode compositions of the present invention have a Raman spectroscopy 2D/G peak ratio of at least 1:1, for example, at least 1.2:1 or 1.3:1. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles used in the anode compositions of the present invention have a relatively low bulk density. For example, the graphenic carbon particles used in certain embodiments of the present invention are characterized by having a bulk density (tap density) of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

In certain embodiments, the graphenic carbon particles used in the anode compositions of the present invention have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3\text{)} = \frac{0.1 \text{ grams}}{\Pi * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 $g/cm^3$, which is the density of graphite.

In certain embodiments, the graphenic carbon particles have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, occurs between the conductive graphenic carbon particles. Such percolation may reduce the resistivity of the coating compositions. The conductive graphenic particles may occupy a minimum volume within the coating such that the particles form a continuous, or nearly continuous, network. In such a case, the aspect ratios of the graphenic carbon particles may affect the minimum volume required for percolation. Furthermore, the surface energy of the graphenic carbon particles may be the same or similar to the surface energy of the elastomeric rubber. Otherwise, the particles may tend to flocculate or demix as they are processed.

The graphenic carbon particles utilized in the anode compositions of the present invention can be made, for example, by thermal processes. In accordance with embodiments of the invention, thermally-produced graphenic carbon particles are made from carbon-containing precursor materials that are heated to high temperatures in a thermal zone such as a plasma. The carbon-containing precursor, such as a hydrocarbon provided in gaseous or liquid form, is heated in the thermal zone to produce the graphenic carbon particles in the thermal zone or downstream therefrom. For example, thermally-produced graphenic carbon particles may be made by the systems and methods disclosed in U.S. patent application Ser. Nos. 13/249,315 and 13/309,894.

In certain embodiments, the graphenic carbon particles may be made by using the apparatus and method described in U.S. patent application Ser. No. 13/249,315 at [0022] to [0048] in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to a temperature of at least 1,000° C. to form the graphenic carbon particles. In other embodiments, the graphenic carbon particles may be made by using the apparatus and method described in U.S. patent application Ser. No. 13/309,894 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature ranging from 1,000° C. to 20,000° C., such as 1,200° C. to 10,000° C. For example, the temperature of the thermal zone may range from 1,500 to 8,000° C., such as from 2,000 to 5,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

Without being bound by any theory, it is currently believed that the foregoing methods of manufacturing graphenic carbon particles are particularly suitable for producing graphenic carbon particles having relatively low thickness and relatively high aspect ratio in combination with relatively low oxygen content, as described above. Moreover, such methods are currently believed to produce a substantial amount of graphenic carbon particles having a substantially curved, curled, creased or buckled morphology (referred to herein as a "3D" morphology), as opposed to producing predominantly particles having a substantially two-dimensional (or flat) morphology. This characteristic is believed to be reflected in the previously described compressed density characteristics and is believed to be beneficial in the present invention because, it is currently believed, when a significant portion of the graphenic carbon particles have a 3D morphology, "edge to edge" and "edge-to-face" contact between graphenic carbon particles within the composition may be promoted. This is thought to be because particles having a 3D morphology are less likely to be aggregated in the composition (due to lower Van der Waals forces) than particles having a two-dimensional morphology. Moreover, it is currently believed that even in the case of "face to face" contact between the particles having a 3D morphology, since the particles may have more than one facial plane, the entire particle surface is not engaged in a single "face to face" interaction with another single particle, but instead can participate in interactions with other particles, including other "face to face" interactions, in other planes. As a result, graphenic carbon particles having a 3D morphology are currently thought to provide the best conductive pathway in the present compositions and are currently thought to be useful for obtaining electrical conductivity characteristics sought by embodiments of the present invention.

The following examples are intended to illustrate various aspects of the invention, and are not intended to limit the scope of the invention.

EXAMPLES

Anode materials comprising mixtures of silicon particles and different types of graphenic carbon particles or carbon black particles in a polymeric binder were made. The graphenic carbon particles used in Samples A and B were produced by a thermal-production method utilizing methane as a precursor material disclosed in U.S. patent application Ser. No. 13/309,894. The thermally-produced graphenic carbon particles of Sample A were further treated with a toluene solution to extract any residual low molecular weight hydrocarbon contaminants. The graphenic particles used in Sample C were XG300 particles commercially available from XG Sciences. The carbon black particles used in Sample D were commercially available Super P carbon black particles.

Electrochemical experiments were performed on Samples A-D using 2016-type coin cells, which were assembled in an argon-filled dry glovebox (MBraun, Inc.) with the Si electrode as the working electrode and the Li metal as the counter electrode. The working electrodes were prepared by casting a slurry consisting of 40 weight percent Si particles (50 nm nanoparticles from Sigma), 40 weight percent graphenic particles or carbon black particles, and 20 weight percent poly(acrylic acid) (PAA) binder. 1 mol L-1 LiPF$_6$ in a mixture of ethylene carbonate, diethyl carbonate and dimethyl carbonate (EC:DEC:DMC, 2:1:2 by vol. %) and 10 weight percent fluoroethylene carbonate (FEC) was used as the electrolyte (Novolyte Technologies, Independence, Ohio). Electrochemical performance was evaluated by galvanostatic charge/discharge cycling on an Arbin BT-2000 battery tester at room temperature under different current densities in the voltage range between 1.5 and 0.01 V versus Li+/Li. The current density and specific capacity are calculated based on the mass of Si only.

Testing protocols included rate testing as follows: first 7 cycles tested using a current density of 1 A/g; current density of 2 A/g was used afterwards.

Figure 2:
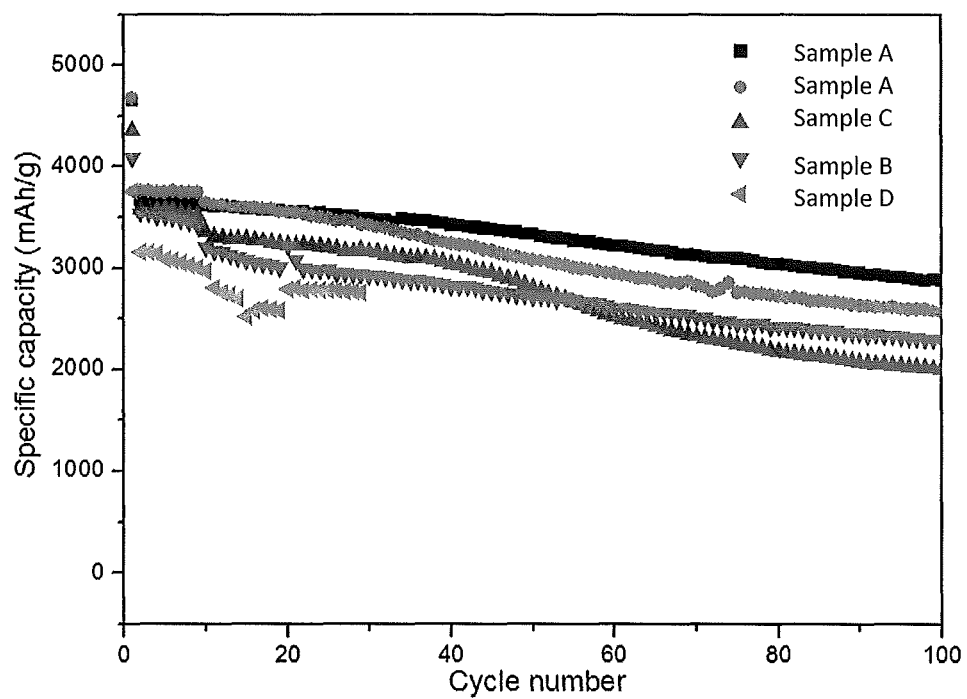
FIGS. 2 and 3 are graphs of specific capacity versus cycle numbers for various test batteries.

FIG. 2 illustrates electrochemical performance of the Sample A-D materials containing different types of graphenic carbon particles or carbon black particles under various constant-current testing protocols. Based on the results shown in FIG. 2, it is clear that both Samples A and B containing the thermally-produced graphenic particles exhibit better capacity retention than Samples C and D containing the commercially available graphene and carbon black, respectively. Sample A also shows higher specific capacity than Sample C.

Figure 3:
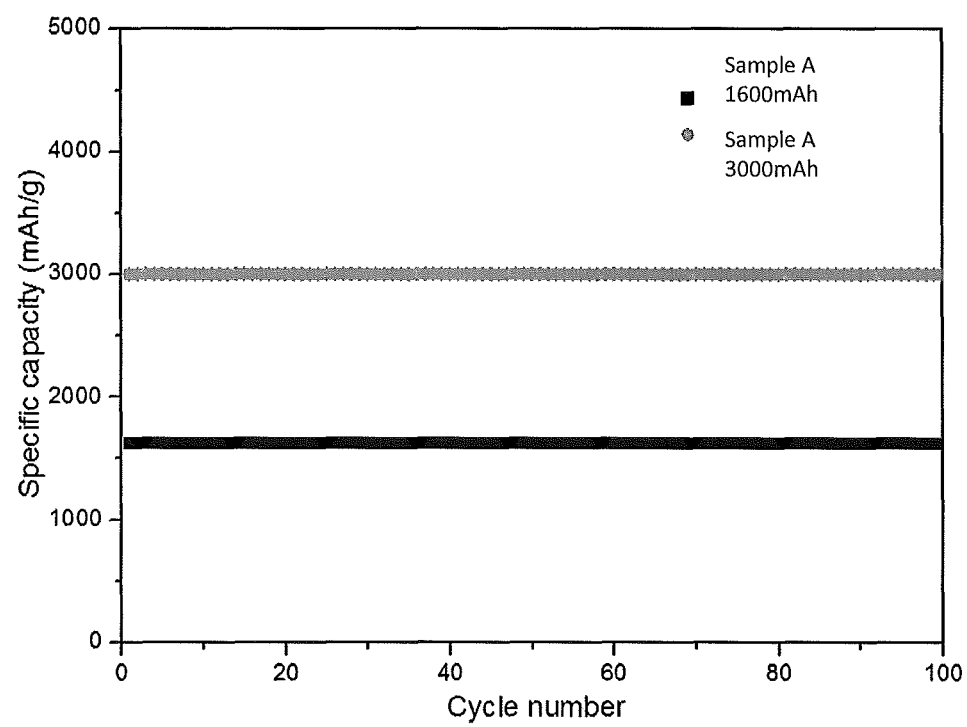

Testing protocols for the data shown in FIG. 3 are as follows: for the capacity limited to 1600 mAh/g, a constant current of 1 A/g was used for both of lithiation (discharge) and delithiation (charge) processes; for the capacity limited to 3000 mAh/g, a constant current of 400 mA/g was used for lithiation (discharge) process while a constant current of 1 A/g was used for delithiation (charge) process to mimic the real application of anode materials in a full battery.

FIG. 3 illustrates the electrochemical performance of Sample A under a constant-capacity testing protocol. FIG. 3 shows that Sample A maintains the capacity well up to 100 cycles when tested with capacity limited to 1,600 and 3,000 mAh/g, respectively.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A lithium ion battery anode coating material comprising:
    lithium-reactive metal particles;
    thermally-produced graphenic carbon particles comprising substantially flat planar sheets having aspect ratios of greater than 3:1, having at least 3 stacked atom layers, and having a Raman spectroscopy 2D/G peak ratio of at least 1:1; and
    a binder connecting the lithium reactive metal particles and the graphenic carbon particles together to form the coating, wherein the lithium reactive metal particles and the graphenic carbon particles are individually bound together with each other by the binder, and the graphenic carbon particles form a continuous network in the coating.

2. The lithium ion battery anode coating material of claim 1, comprising from 15 to 85 weight percent of the lithium-reactive metal particles, from 3 to 75 weight percent of the graphenic carbon particles, and from 3 to 60 weight percent of the binder.

3. The lithium ion battery anode coating material of claim 2, wherein the lithium-reactive metal particles comprise from 25 to 70 weight percent, and the graphenic carbon particles comprise from 10 to 60 weight percent.

4. The lithium ion battery anode coating material of claim 2, wherein the lithium-reactive metal particles comprise from 30 to 50 weight percent, and the graphenic carbon particles comprise from 30 to 50 weight percent.

5. The lithium ion battery anode coating material of claim 1, wherein the graphenic carbon particles have aspect ratios of greater than 5:1.

6. The lithium ion battery anode coating material of claim 1, wherein the graphenic carbon particles have average thicknesses of no more than 10 nanometers.

7. The lithium ion battery anode coating material of claim 1, wherein the lithium-reactive metal comprises Si, Sn or a combination thereof.

8. The lithium ion battery anode coating material of claim 1, wherein the lithium-reactive metal particles comprise Si having an average particle size of less than 1,000 nanometers.

9. The lithium ion battery anode coating material of claim 8, wherein the Si particles have an average particle size of from 5 to 200 nanometers.

10. The lithium ion battery anode coating material of claim 8, wherein the Si particles have an average particle size of from 10 to 120 nanometers.

11. The lithium ion battery anode coating material of claim 1, wherein the binder comprises a polymer.

12. The lithium ion battery anode coating material of claim 11, wherein the polymer comprises poly (acrylic acid).

13. The lithium ion battery anode coating material of claim 1, wherein the battery anode material is provided as a layer on a conductive substrate.

14. The lithium ion battery anode coating material of claim 13, wherein the conductive substrate comprises metal foil.

15. The lithium ion battery anode coating material of claim 13, wherein the layer of battery anode material has a thickness of from 5 to 500 microns.

16. The lithium ion battery anode coating material of claim 13, wherein the layer of battery anode material has a thickness of from 20 to 200 microns.

17. The lithium ion battery anode coating material of claim 13, wherein the battery anode material has an electrical resistivity of less than 250 ohms/square.

18. The lithium ion battery anode coating material of claim 1, wherein the graphenic carbon particles further comprise curved, curled, creased or buckled sheets.

19. The lithium ion battery anode coating material of claim 1, wherein the graphenic carbon particles have a compressed density of less than 0.9.

20. The lithium ion battery anode coating material of claim 1, wherein the graphenic carbon particles have a Raman spectroscopy 2D/G peak ratio of at least 1.2:1.

21. The lithium ion battery anode coating material of claim 1, wherein the graphenic carbon particles have an oxygen content of no more than 2 atomic percent.

22. The lithium ion battery anode coating material of claim 1, wherein the lithium reactive metal particles and the graphenic carbon particles are uniformly dispersed within the binder.

23. The lithium ion battery anode coating material of claim 1, wherein a portion of the graphenic carbon particles are curved, curled, creased or buckled.

24. The lithium ion battery anode coating material of claim 1, wherein the graphenic carbon particles comprise at least 4 stacked atom layers.

25. The lithium ion battery anode coating material of claim 1, wherein the graphenic carbon particles comprise at least 6 stacked atom layers.

26. A lithium ion battery comprising:
an anode;
a cathode;
a separator between the anode and the cathode; and
an electrolyte in contact with the anode and the cathode, wherein the anode comprises a coating of lithium-reactive metal particles, thermally-produced graphenic carbon particles comprising substantially flat planar sheets having aspect ratios of greater than 3:1, having at least 3 stacked atom layers and having a Raman spectroscopy 2D/G peak ratio of at least 1:1, and a binder connecting the lithium reactive metal particles and the graphenic carbon particles together to form the coating, wherein the lithium reactive metal particles and the graphenic carbon particles are individually bound together with each other by the binder, and the graphenic carbon particles form a continuous network in the coating.

27. The lithium ion battery of claim 26, wherein the anode coating comprises from 15 to 85 weight percent of the lithium-reactive metal particles, from 3 to 75 weight percent of the graphenic carbon particles, and from 3 to 60 weight percent of the binder.

28. The lithium ion battery of claim 26, wherein the graphenic carbon particles have an oxygen content of no more than 2 atomic percent.

29. The lithium ion battery of claim 26, wherein the lithium reactive metal particles and the graphenic carbon particles are uniformly dispersed within the binder.

30. The lithium ion battery of claim 26, wherein a portion of the graphenic carbon particles are curved, curled, creased or buckled.

31. The lithium ion battery of claim 26, wherein the graphenic carbon particles have a Raman spectroscopy 2D/G peak ratio of at least 1.2:1.

32. The lithium ion battery of claim 26, wherein the graphenic carbon particles comprise at least 4 stacked atom layers.

33. The lithium ion battery of claim 26, wherein the graphenic carbon particles comprise at least 6 stacked atom layers.

* * * * *